UNITED STATES PATENT OFFICE.

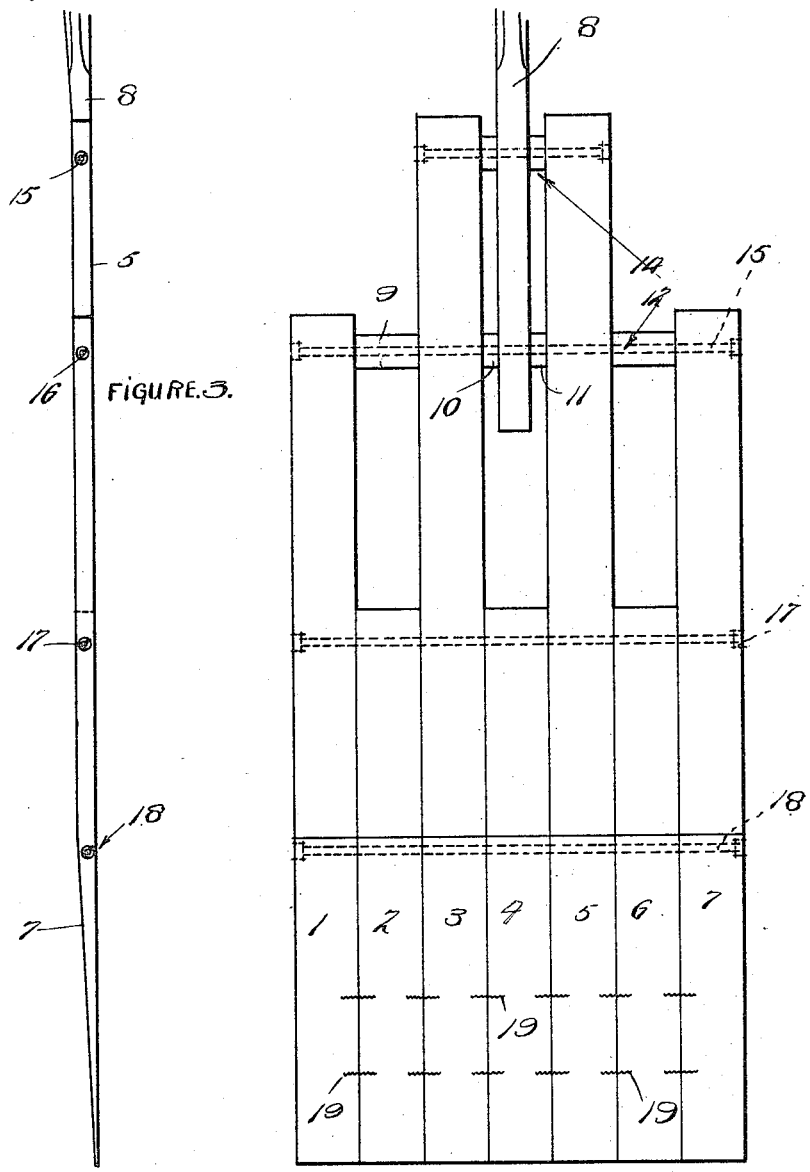

ALBERT H. WOOLLEY, OF SAN FRANCISCO, CALIFORNIA.

BAKER'S PEEL.

1,268,658.

Specification of Letters Patent.

Patented June 4, 1918.

Application filed May 6, 1916. Serial No. 95,943.

*To all whom it may concern:*

Be it known that I, ALBERT H. WOOLLEY, a citizen of the United States, residing at the city and county of San Francisco, State of California, have invented a new and useful Improvement for Bakers' Peel, of which the following is a specification.

This invention relates to an improved baker's peel which is a tool for inserting in and removing from ovens the ordinary bakery products, whether in pans or when simply placed on the floor of the oven without a pan.

An object of the invention is to produce a peel made of a series of hardwood strips secured together which will be light and strong while at the same time preventing the peel from being so likely to split, as would be the case with a peel made of one wide board.

Another object of the invention is to provide an additional support for the outer edges of the peel, and to lessen the danger of splitting.

In the drawings:—

Figure 1 is a plan view of the peel with the handle broken away for purposes of illustration, Fig. 2 is a transverse sectional view of the peel showing one of the rods holding the strips together in dotted lines, and Fig. 3 is a side elevation of the peel as shown in Fig. 1.

The peel consists of a plurality of hardwood strips 1 to 7 inclusive, of which the strips 2, 4 and 6 are of the same length and shorter than the four other strips. The strips 1 and 7 are longer than the strips 2, 4 and 6, but are not as long as the two strips 3 and 5 which latter are long enough to be connected to the handle 8.

When all assembled, the three short strips alternate with the longer strips, so that openings are provided at the thicker end of the peel to lighten it.

Spreaders 9 to 14 serve to hold the members 1, 3, 5 and 7 at the proper distance from each other and from the handle when the bolts 15 to 18 are tightened in place in the holes extending through the several strips, spreaders and handle.

In order to insure holding the tapered ends of the strips together, they are connected in their edges by means of a plurality of corrugated nails 19.

It will of course be understood that the peel may be made of any desired material, and may be of such length or size as is desired.

What I claim and desire to secure by United States Letters Patent is as follows:—

A baker's peel consisting of a plurality of tapered flat strips of several lengths of wood, the strips being arranged alternately short and long with two of the longest strips on opposite edges of one of the shortest strips at the center, bolts for securing the strips together, a handle bolted to the two longest strips, one of the bolts passing through the handle also passing through the intermediate length strips.

A. H. WOOLLEY.

Copies of this patent may be obtained for five cents each, by addressing the "Commissioner of Patents, Washington, D. C."